United States Patent [19]
Behring, II

[11] Patent Number: 5,880,378
[45] Date of Patent: Mar. 9, 1999

[54] CRITICAL FLOW VENTURI WITH VARIABLE AND CONTINUOUS RANGE

[75] Inventor: Kendricks A. Behring, II, San Antonio, Tex.

[73] Assignee: Southwest Research Institute, San Antonio, Tex.

[21] Appl. No.: 912,447

[22] Filed: Aug. 18, 1997

Related U.S. Application Data

[60] Provisional application No. 60/025,005 Aug. 19, 1996.
[51] Int. Cl.$^6$ ....................................................... G01F 1/22
[52] U.S. Cl. ........................................................ 73/861.53
[58] Field of Search ........................... 73/861.63, 861.64, 73/861.53

[56] References Cited

U.S. PATENT DOCUMENTS

| | | | |
|---|---|---|---|
| 3,906,792 | 9/1975 | Miller | 73/861.53 |
| 3,910,112 | 10/1975 | Gerlach | 73/861.53 |
| 4,324,143 | 4/1982 | Olson | 73/861.64 |
| 4,387,685 | 6/1983 | Abbey | 73/861.53 |
| 4,644,800 | 2/1987 | Kozlak | 73/861.64 |
| 4,873,873 | 10/1989 | Day | 73/861.63 |
| 5,696,318 | 12/1997 | Ernst et al. | 73/118.2 |

*Primary Examiner*—Richard Chilcot
*Assistant Examiner*—Jewel V. Thompson
*Attorney, Agent, or Firm*—Baker & Botts, L.L.P.

[57] ABSTRACT

A critical flow venturi with either a movable centerbody or a fixed replaceable centerbody is provided for fluid flow measuring or fluid flow control by changing the critical flow rate area of the venturi. The critical flow venturi and its associated centerbody may be used with a wide variety of fluids including liquids, gases and mixtures thereof. A critical flow venturi with easily exchangeable centerbodies can conveniently provide a range of discrete high capacity calibration grade flow rates near atmospheric pressure. The discharge coefficient for each critical flow venturi may be accurately determined analytically to potentially eliminate the need for experimental calibrations. For pressurized applications, a remotely actuated centerbody may be preferred. The movable centerbody may be contoured to achieve unique flow characteristics, such as a linear change in critical flow rate in response to changes in the longitudinal position of the centerbody relative to the throat of the venturi. Alternatively, a movable centerbody may provide a uniform critical flow rate with changing fluid conditions such as temperature, pressure and composition upstream from the venturi.

24 Claims, 4 Drawing Sheets

CRITICAL FLOW VENTURI WITH VARIABLE AND CONTINUOUS RANGE

RELATED PATENT APPLICATIONS

This application claims priority under 35 U.S.C. § 119(e)(1) of provisional application number 60/025,005 filed Aug. 19, 1996.

TECHNICAL FIELD OF THE INVENTION

The present invention generally relates to the field of fluid (gas or liquid) metering. More specifically, the present invention includes a critical flow venturi with a variable throat area, which may be used to measure fluid flow, to calibrate other fluid flow meters, or to control fluid flow in a wide variety of systems.

BACKGROUND OF THE INVENTION

For many years, venturis have been used to measure fluid flow rates for both liquids and gases. Venturis are often used to measure fluid flow since they generally cause less permanent loss of fluid pressure as compared to other metering devices such as an orifice or nozzle. Considerable testing and development has been conducted with respect to using venturis to measure and/or control high flow rates of compressible fluids associated with jet engines, rocket motors and steam turbines. Venturis in which fluid travels at the speed of sound through the narrowest restriction of the venturis are often referred to as critical flow venturis. Such venturis have been used to provide accurate, simple and highly reliable flow meters. However, most critical flow venturis can only be used to measure or control discrete fluid flow rates within a limited range depending upon the dimensions of the narrowest restriction within the venturi and fluid temperature, pressure, and composition upstream from the respective venturi.

If fluid flowing in a closed conduit is accelerated through a geometrical restriction of appropriate dimensions relative to dimensions of the conduit upstream from the restriction, the speed of fluid flow at the narrowest portion of the restriction will reach the local speed of sound. When the local speed of sound is reached, the flow is said to be critical or sonic. Knowledge of the upstream thermodynamic state (such as knowledge of fluid pressure, temperature and composition) may be applied in conjunction with the known cross sectional area of the narrowest restriction in the venturi, to calculate the critical flow rate using the First and Second Laws of Thermodynamics, and state equations for fluid density and the sound speed in the respective fluid. One-dimensional and non-isentropic modeling errors can be correlated to the Reynolds number of the fluid flowing through the narrowest restriction. Critical flow conditions have been widely used to measure fluid flow rates for nearly half a decade using venturis with fixed cross-sectional flow areas at the narrowest restriction.

Current technology in critical flow metering of fluids typically uses a fixed geometry flow restriction that allows only one, discrete flow rate, the critical flow rate, to pass through the meter or critical flow venturi for a given condition of upstream fluid pressure, temperature and composition. Because of this critical flow rate limitation, most critical flow venturis have essentially no flow rate range. Thus, fixed geometry critical flow venturis are often connected in parallel metering conduit runs, with each run having a critical flow venturi capable of metering a single critical flow rate for a given upstream fluid pressure, temperature and composition. In such multiple metering conduit configurations, multiple discrete fluid flow rates may be achieved by valving combinations of individual metering runs open or closed.

SUMMARY OF THE INVENTION

In accordance with teachings of the present invention, the disadvantages and problems associated with previous critical flow venturis have been substantially reduced or eliminated. Variable critical flow rates, in either discrete increments or as a continuous function within a selected range, may be provided by a single critical flow venturi incorporating teachings of the present invention.

One aspect of the present invention includes providing a critical flow venturi having a centerbody disposed adjacent to or within the narrowest restriction of the venturi to modify the effective cross sectional area of the narrowest restriction and thus, the critical flow rate. For one application, the location of the centerbody may be varied relative to the narrowest restriction of the venturi to provide a continuous, variable range of critical flow rates through the narrowest restriction. For this application, the exterior surface of the centerbody may be contoured to provide a linear change in flow rate which is proportional to the longitudinal position of the centerbody relative to the narrowest restriction. Alternatively, the exterior surface of the centerbody may be contoured to provide a constant critical flow rate as the longitudinal position of the centerbody relative to the narrowest restriction is varied in response to changing fluid conditions such as pressure, temperature and composition upstream from the critical flow venturi. For other applications, exchangeable or replaceable centerbodies may be used to vary in discrete increments the effective cross sectional area of the narrowest restriction and thus the critical flow rate through the venturi.

Technical benefits of the present invention include providing a critical flow venturi having a centerbody disposed adjacent to or within the narrowest restriction of the venturi to provide a highly accurate, low cost, reliable, and efficient answer to high volume compressible fluid flow metering problems.

Another aspect of the present invention includes a critical flow venturi having a centerbody with two primary components, a movable component or nose cone and a fixed component or tail cone. The exterior surface of both the tail cone and the nose cone are preferably contoured to minimize fluid pressure loss. The nose cone may also be contoured to provide either a linear change in critical flow rate proportional to the longitudinal position of the nose cone relative to the narrowest restriction or a constant critical flow rate in response to changing fluid conditions upstream from the venturi. The movable component may be actuated relative to the fixed component to create a variable cross-sectional area restriction at which critical flow will be sustained for fluid metering or fluid control purposes. The present invention provides an accurate, simple, reliable, cost-effective, and compact metering package, especially for high capacity fluid flow systems.

BRIEF DESCRIPTION OF THE DRAWINGS

For a more complete understanding of the present invention and for further advantages thereof, reference is now made to the following description taken in conjunction with the accompanying drawings, in which.

DETAILED DESCRIPTION OF THE INVENTION

The preferred embodiments of the present invention and its advantages are best understood by referring to FIGS. 1–6 of the drawings, like numerals being used for like and corresponding parts of the various drawings.

Figure 1:
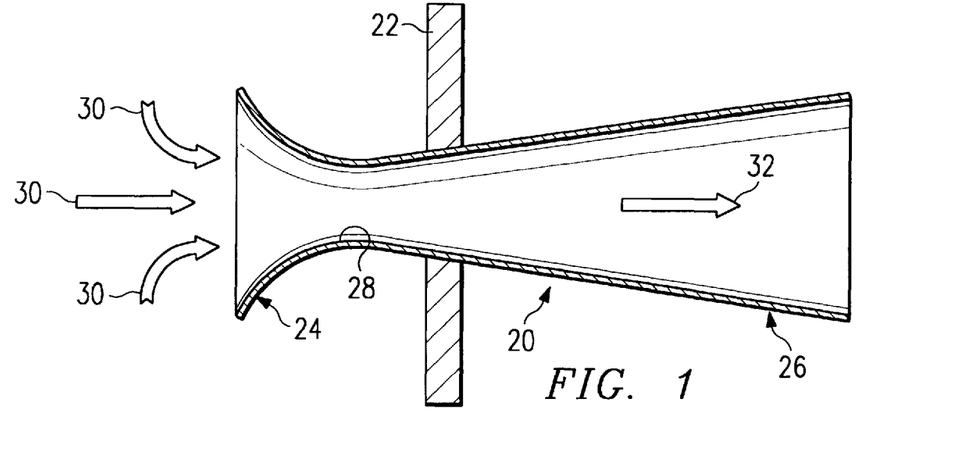
FIG. 1 is a schematic drawing in section with portions broken away showing a traditional critical flow venturi.

Critical flow venturi 20 is shown in FIG. 1 disposed within and attached to supporting structure 22. Critical flow venturi 20 includes first tapered section or inlet cone 24 and second tapered section or outlet cone 26. First tapered section 24 may sometimes be referred to as an inlet nozzle. Second tapered section 26 may sometimes be referred to as a diffuser, a discharge cone or an expanding section. Throat 28 is defined as the narrowest restriction for fluid flow within critical flow venturi 20 between inlet cone 24 and outlet cone 26.

First tapered section 24 and second tapered section 26 preferably have generally conical configurations with circular cross-sections that converge at throat 28 to provide the narrowest restriction or smallest fluid flow area within critical flow venturi 20. The present invention may be used with venturis having a cross-section other than circular. However, a generally circular cross section particularly at throat 28 will typically result in optimum performance of the associated critical flow venturi 20.

For many types of restrictive fluid flow meters, a significant amount of experimental testing must often be conducted to determine the discharge coefficient ($C_d$). The discharge coefficient is used to account for differences between mathematically calculated fluid flow rates and actual fluid flow rates through the respective meter. One of the technical benefits associated with the use of critical flow venturi 20 includes the ability to accurately calculate discharge coefficients with very little, if any, experimental testing of critical flow venturi 20. The coefficient of discharge for critical flow venturi 20 may be as high as 0.995, which means that the mathematically calculated flow rates are a very good predictor of the actual flow rates that would be expected through critical flow venturi 20.

When a fluid indicated by arrows 30 is drawn or forced into inlet cone 24, the velocity of the fluid flow will increase and the pressure of the fluid will decrease as the fluid moves toward throat 28. As fluid flows away from throat 28 as indicated by arrow 32, fluid velocity will generally decrease and fluid pressure will increase. By properly designing outlet cone or diffuser 26, ninety-five percent (95%) or more of the initial fluid pressure entering critical flow venturi 20 at inlet cone 24 will be recovered when the fluid exits outlet cone 26 as a result of gradually decelerating fluid flow with minimum turbulence within diffuser 26.

For some applications, a sufficiently large difference in pressure may exist between fluid pressure upstream of inlet cone 24 and fluid pressure exiting outlet cone 26 so that the fluid velocity may increase into the supersonic range downstream of throat 28 within outlet cone 26. For many applications, the fluid velocity within outlet cone 26 will decrease through shock waves from the supersonic range to subsonic velocity. As will be discussed later in more detail, the present invention allows minimizing the effect of any transition from supersonic fluid velocity to a subsonic fluid velocity within outlet cone 26 such that the efficiency of pressure diffuser 26 remains very high with maximum pressure recovery of the fluid flowing therethrough.

For a given set of fluid conditions such as pressure, temperature and composition upstream from inlet cone 24, the fixed geometry of throat 28 within venturi 20 will allow only one, discrete fluid flow rate when fluid flow through throat 28 reaches the speed of sound in the specific fluid. For purposes of the present application, this fluid flow rate is sometimes referred to as the critical flow rate.

Critical flow venturi 20 as shown in FIG. 1 can only pass a single, discrete critical flow rate for a given upstream pressure, temperature and composition of fluid. Even if sufficient differential pressure is applied to venturi 20 to cause supersonic flow within outlet 26 and/or a fluid flow conduit attached thereto, the velocity of fluid flow within throat 28 will not exceed the speed of sound for the specific fluid conditions within throat 28.

Figure 2:
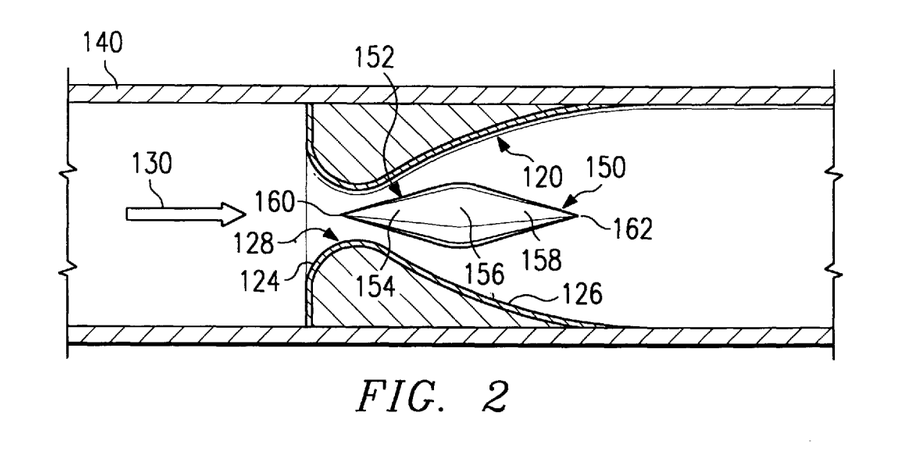
FIG. 2 is a schematic drawing in section with portions broken away showing a fluid flow conduit having a critical flow venturi installed therein and a movable centerbody disposed adjacent to the narrowest restriction of the venturi in accordance with teachings of the present invention.

Critical flow venturi 120 and centerbody 150 as shown in FIG. 2 cooperate with each other to provide a variable and continuous range of critical fluid flow rates through throat 128. Critical flow venturi 120 includes inlet cone 124, outlet cone 126 and throat 128 disposed therebetween. The design and function of these components of critical flow venturi 120 are similar to the same components for previously described critical flow venturi 20.

For the embodiment of the present invention shown in FIG. 2, centerbody 150 is disposed within outlet cone 126. For other applications, centerbody 150 may be disposed adjacent to and extending into inlet cone 124. As will be discussed later in more detail, centerbody 150 is preferably movable relative to throat 128 along the longitudinal centerline of critical flow venturi 120.

Critical flow venturi 120 is shown in FIG. 2 disposed within fluid flow conduit 140. A source of high pressure (not expressly shown) may be attached to one end of fluid flow conduit 140 or a source of low pressure (not expressly shown) may be attached to the opposite end of fluid flow conduit 140 to cause fluid flow in the direction indicated by arrow 130. Critical flow venturi 120 and centerbody 150 may be satisfactorily used with a wide variety of fluids. The fluid flowing through conduit 140 may be either a gas, a liquid or a mixture of gas and liquid. Also, the fluid may include small, solid particles in which case critical flow venturi 120 and centerbody 150 are preferably manufactured from hard, abrasion-resistant materials.

The position of centerbody 150 may be varied longitudinally relative to throat 128 to vary the associated cross sectional area of throat 128 and thus the critical flow rate through venturi 120. Exterior surface 152 of centerbody 150 is preferably contoured to minimize fluid pressure losses within venturi 120. Centerbody 150 includes nose portion 154, middle portion 156 and tail portion 158. Nose portion 154 preferably has a generally conical configuration with a generally circular cross section increasing in diameter from tip 160 towards middle portion 156. In a similar manner, tail portion 158 preferably has a generally conical configuration with a generally circular cross section decreasing in diameter from middle portion 156 towards tip 162. The portion of exterior surface 152 adjacent to middle portion 156 preferably has a generally curved configuration to provide a smooth transition between nose portion 154 and tail portion 156. The specific dimensions and geometric configuration of centerbody 150 may be optimized to provide a linear change in critical flow rate through throat 128 in response to longitudinal movement of centerbody 150, or a constant critical velocity flow rate through throat 128 in response to changes in upstream fluid conditions.

Figure 3A:
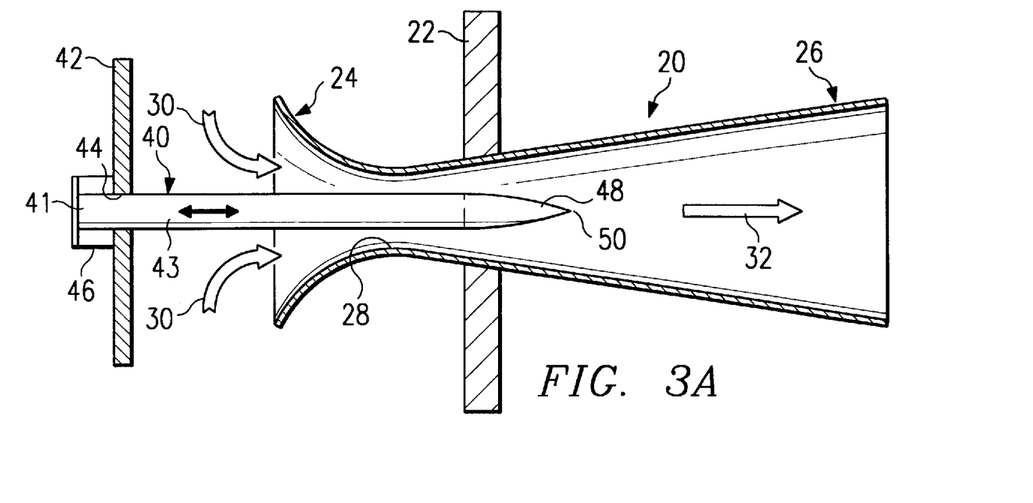
FIG. 3A is a schematic drawing in section with portions broken away showing a critical flow venturi having a replaceable or exchangeable centerbody disposed within the narrowest restriction of the venturi in accordance with teachings of the present invention.

FIG. 3A shows critical flow venturi 20 with a portion of centerbody 40 disposed within throat 28. For this embodiment of the present invention, centerbody 40 may sometimes be referred to as a replaceable or exchangeable centerbody. Also, centerbody 40 may sometimes be referred to as a fixed centerbody because after centerbody 40 has been inserted into critical flow venturi 20, its position does not change relative to throat 28. As noted with respect to critical flow venturi 120, the position of centerbody 150 may be varied relative to throat 128.

Centerbody 40 preferably has a generally elongated, cylindrical configuration. For some applications, centerbody 40 may be formed from either a solid rod or a hollow section of tubing having the desired length and outside diameter depending upon the geometric configuration of critical flow venturi 20 and the type of fluid flowing therethrough. Centerbody 40 has three primary components. Base 41 is formed at one end of centerbody 40. Tail cone 48 is formed on the opposite end of centerbody 40 with middle portion 43 extending therebetween.

For the embodiment shown in FIG. 3A, centerbody 40 is disposed within and releasably attached to supporting structure 42. Base portion 41 of centerbody 40 preferably has a generally cylindrical configuration with an outside diameter sized to fit within opening 44 of supporting structure 42. For the embodiment shown in FIG. 3A, opening 44 preferably has a generally circular configuration and is concentrically aligned with the longitudinal axis of critical flow venturi 20.

Clamp or holder 46 is provided to releasably secure centerbody 40 within opening 44. Various types of releasable anchoring mechanisms in addition to clamp 46 may be satisfactorily used to releasably secure base 41 of centerbody 40 within opening 44. For example, for some applications, matching threads (not shown) may be formed on the interior of opening 44 and the exterior of base 41.

The length of centerbody 40 is selected to allow middle portion 43 of centerbody 40 to extend from supporting structure 42 through throat 28 and into outlet cone 26. Supporting structure 42 is preferably spaced a sufficient distance longitudinally from inlet cone 24 to insure that supporting structure 42 will not restrict or affect fluid flow into inlet cone 24.

Tail cone 48 is preferably formed on the end of centerbody 40 disposed within outlet cone 26. The exterior configuration of tail cone 48 is selected to minimize pressure losses as fluid exits from throat 28. For one application, tail cone 48 has a generally conical configuration with a circular cross section tapering from middle portion 43 towards tip 50. The base of tail cone 48 preferably has an outside diameter equal to the outside diameter of middle portion 43 of centerbody 40. Thus, centerbody 40 has a generally smooth exterior surface extending through inlet cone 24, throat 28 and terminating at tip 50 to minimize any fluid pressure loss within venturi 20.

For a given set of upstream fluid conditions including temperature, pressure, and composition, the largest critical flow rate through critical flow venturi 20 will occur when throat 28 is fully open as shown in FIG. 1. When centerbody 40 is inserted into throat 28 as shown in FIG. 3A, the effective cross-sectional area of throat 28 is substantially reduced which results in a corresponding reduction in the critical flow rate through throat 28.

One of the reasons for using a venturi to measure or control fluid flow is the relatively low pressure loss between the inlet and the outlet of a venturi. As previously noted, for some applications in which a large overall difference in pressure exists, the velocity of fluid leaving throat 28 may increase to a supersonic level in outlet cone 26. Depending upon the location of the shock from supersonic to subsonic within outlet 26, the efficiency of outlet 26 in recovering fluid pressure will vary. When such conditions exist, centerbody 240 shown in FIG. 3B may be used in place of centerbody 40 to locate the shock wave transition early in outlet 26 (at the centerbody notch 249) for maximum efficiency.

Figure 3B:
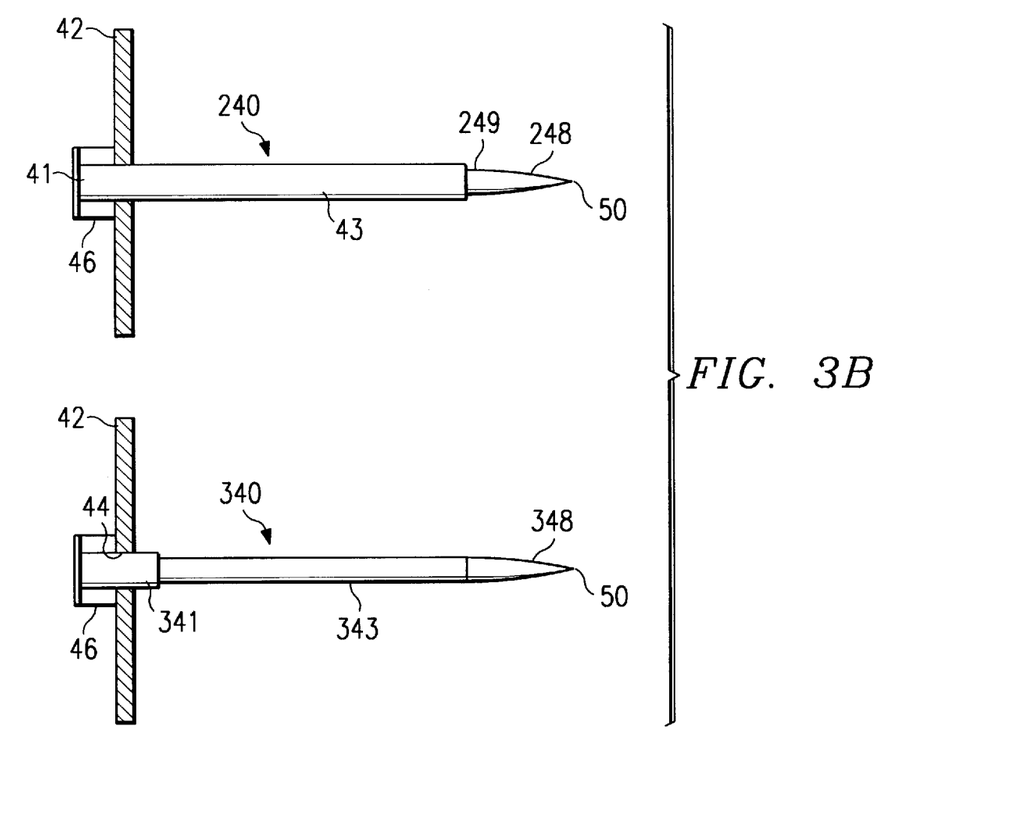
FIG. 3B is a schematic drawing showing alternative centerbodies which may be disposed within the critical flow venturi of FIG. 3A to provide discrete changes in the critical flow rate through the narrowest restriction in accordance with teachings of the present invention.

Centerbody 240 includes base 41 and middle portion 43 as previously described with respect to centerbody 40. Tail cone 248 formed on the end of centerbody 240 opposite from base 41 has a similar geometric configuration as compared to tail cone 48, except the largest diameter of tail cone 248 is reduced as compared to the diameter of middle portion 43. As a result of this change in diameter, notch 249 is formed on the exterior surface of centerbody 240 at the transition between middle portion 43 and tail cone 248. Notch 249 serves as a trigger to initiate the shock wave from supersonic to subsonic velocity. By properly selecting the location of notch 249 relative to throat 28, the efficiency decreasing effects of delayed shock waves within outlet cone 26 or a fluid flow conduit attached thereto can be substantially minimized.

Centerbody 340 is also shown in FIG. 3B having base 41, middle portion 343, and tail cone 348. Base portion 41 has an outside diameter compatible with the inside diameter of opening 44. Middle portion 343 has an outside diameter which is substantially reduced as compared to the outside diameter of middle portion 43. The largest diameter of tail cone 348 may be less than or equal to the outside diameter of middle portion 343. Centerbody 340 may be inserted into critical flow venturi 20 to provide a third discrete critical fluid flow rate as compared to a largest flow rate when throat 28 is fully opened or the reduced flow rate when centerbody 40 is installed within throat 28. Thus, centerbodies 40 and 340 allow critical flow venturi 20 to have three discrete critical flow rates for the same set of upstream fluid conditions.

Figure 4:
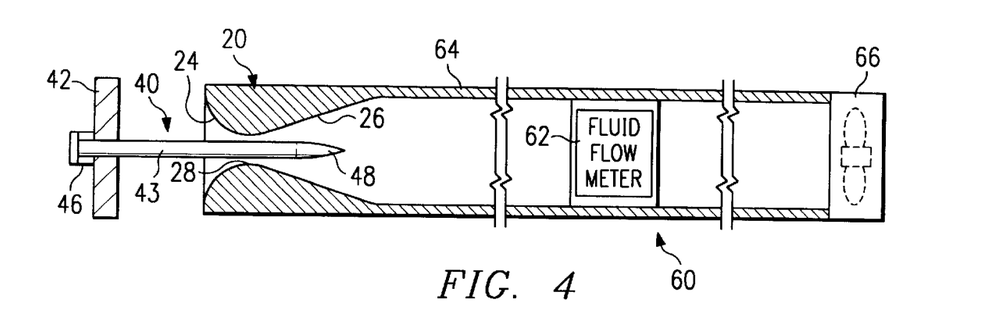
FIG. 4 is a schematic drawing in section with portions broken away showing a system for testing or proving the performance of a fluid flow meter using a critical flow venturi along with at least one replaceable centerbody in accordance with teachings of the present invention.

System 60 for proving or testing the performance of fluid flow meter 62 using critical flow venturi 20 is shown in FIG. 4. For this application, outlet cone 26 of critical flow venturi 20 discharges to one end of fluid flow conduit 64. A source of low pressure such as blower 66 is preferably attached to the other end of conduit 64 opposite from critical flow venturi 20. Fluid flow meter 62 is connected to fluid flow conduit 64 between critical flow venturi 20 and blower 66. Various types of commercially available piping, tubing, and couplings may be satisfactorily used to attach critical flow venturi 20, fluid flow meter 62, and blower 66 as shown in FIG. 4. For some applications, system 60 may be mounted on a trailer or other suitable vehicle to allow testing fluid flow meters at the remote field location. Fluid flow meter 62 is connected to outlet cone 26 of critical flow venturi 20 such that all fluid flowing through critical flow venturi 20 must also flow through fluid flow meter 62.

For one test of fluid flow meter 62, centerbody 40 is preferably removed from supporting structure 42 and throat 28. In this configuration, the largest critical flow rate will occur through throat 28 for the existing upstream conditions of pressure, temperature and composition of fluid. By measuring these values, the critical fluid flow rate through throat 28 can be determined. The critical fluid flow rate may then be compared with the flow rate measured by fluid flow meter 62 to determine if fluid flow meter 62 is correctly indicating the fluid flow rate.

After conducting one test, blower 66 is preferably turned off and centerbody 40 inserted into throat 28. As previously noted, placing centerbody 40 within throat 28 changes the critical flow rate for the same set of upstream fluid conditions. Thus, a second critical flow rate will occur through venturi 20. The reading on fluid flow meter 62 can be compared with the second critical flow rate to determine if fluid flow meter 62 is performing satisfactorily at the second flow rate.

For some applications, it may be necessary to only test the performance of fluid flow meter 62 at two discrete critical flow rates. For other applications, it may be desirable to test fluid flow meter 62 with at additional critical flow rates. For such applications, centerbody 340 having a different outside diameter for middle portion 343 may also be used.

System 60 may be satisfactorily used to test high capacity gas flow meters using air at atmospheric conditions. The cost of providing one or more exchangeable centerbodies is relatively small as compared to the manufacturing cost associated with multiple critical flow venturis arranged in a series of parallel metering runs to provide a range of critical flow rates. Also, conducting tests with air at atmospheric conditions allows for easy exchange of centerbodies inserted into throat 28 of critical flow venturi 20. System 60 as shown in FIG. 4, may be very compact and relatively inexpensive to manufacture since there is no requirement to provide fluid seals at centerbody holder 46. Also, there are no moving parts associated with critical flow venturi 20 or centerbodies 40, 240 and 340.

Figure 5:
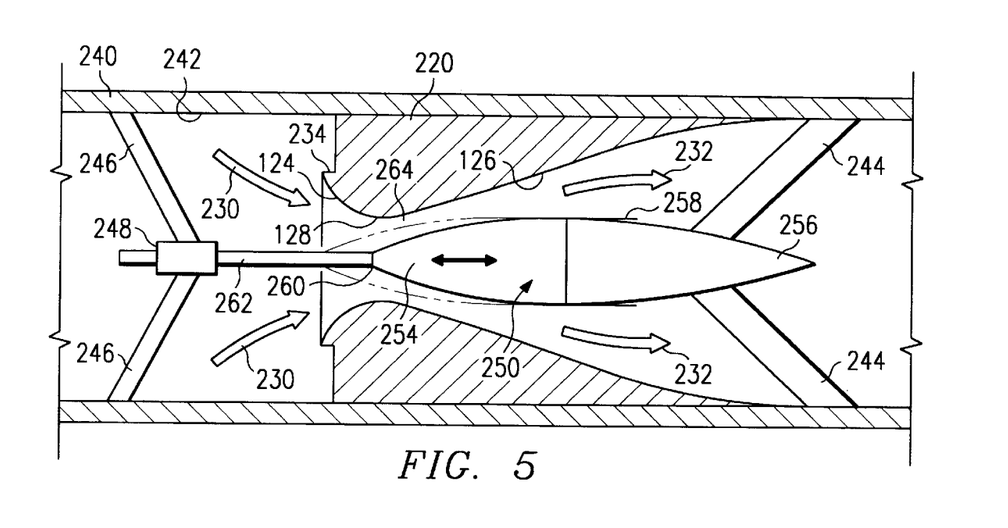
FIG. 5 is a schematic drawing in section with portions broken away showing a critical flow venturi having a centerbody disposed therein for varying the critical flow rate through the venturi in accordance with teachings of the present invention.

Critical flow venturi 220 and centerbody 250 incorporating a further embodiment of the present invention are shown in FIG. 5 disposed within fluid flow conduit 240. Critical flow venturi 220 is similar to critical flow venturi 120 except for annular notch 234 formed on the exterior of inlet cone 124. Depending upon the type of fluid flowing through conduit 240 and the conditions existing at inlet cone 124, a relatively thick boundary layer may form on the interior surface 242 of fluid flow conduit 240. Notch 234 is formed on the exterior of inlet cone 124 to break up the boundary layer flow associated with interior surface 242. The location of notch 234 relative to throat 128 is selected to minimize the length and thickness of any fluid boundary layer occurring within inlet cone 124 and throat 128.

Centerbody 250 is preferably disposed within outlet cone 126 by struts or stabilizers 244. Centerbody 250 includes first portion or nose cone 254, and second portion or tail cone 256. Second portion 256 is rigidly fixed to struts 244 and does not move relative to throat 128. First portion 254 is preferably movable longitudinally relative to throat 128 and second portion 256.

The position of nose cone 254 of centerbody 250 relative to throat 128 may be varied, by an actuator contained within centerbody 250. For some applications, the actuator may be an electric, pneumatic, or hydraulic motor. For other applications, the actuator may include one or more hydraulic or pneumatic pistons.

The exterior surface of struts 244 preferably have an aerodynamic configuration to minimize fluid pressure losses within outlet cone 126 and fluid flow conduit 240. One or more struts 244 may also have a hollow passage way formed therein (not shown) to allow supplying either electrical power, hydraulic fluid or pneumatic fluid to the actuator contained within centerbody 250.

First portion 254 of centerbody 250 preferably has a configuration similar to nose cone 154. Second portion 256 of centerbody 250 preferably has a configuration similar to previously described tail cone 158. One of the differences between nose cone 154 and nose cone 254 includes the addition of guide rod 262 at tip 260. A plurality of struts 246 are preferably formed within fluid conduit 240 upstream from inlet cone 124. Struts 246 cooperate with each other to position linear bearing 248 aligned with the longitudinal centerline of critical flow venturi 220. Guide rod 262 has a generally elongated, cylindrical configuration. The length of guide rod 262 is preferably selected to extend from the nose cone 254 through linear bearing 248. Guide rod 262 and linear bearing 248 cooperate with each other to maintain nose cone 254 of centerbody 250 concentrically aligned within throat 128.

Sleeve 258 is preferably formed as part of nose cone 254 and extends over an adjacent portion of tail cone 256. When the actuator moves nose cone 254 longitudinally into throat 128, sleeve 258 will cover any gap formed between nose cone 254 and tail cone 256 to minimize any turbulence on the exterior of centerbody 250.

For some applications, it may be desirable to provide a linear change in flow rate in response to changes in the longitudinal position of nose cone 254 relative to throat 128. Depending upon the specific geometric configuration of critical flow venturi 220, and the fluid flowing therethrough, the optimum configuration for the exterior surface of centerbody 250 may be mathematically calculated. For one application, the centerbody half angle of nose cone 254 decreases from approximately 28° at tip 260 to approximately 15° at skirt 256. This change in centerbody half angle occurs because nose cone 254 blocks a greater portion of throat 128 per unit of longitudinal movement along the center line of critical flow venturi 220 as throat 128 is closed. Dotted line 264 shows the position of nose cone 254 after it has fully extended into throat 128. By properly selecting the exterior configuration, a change in the position of nose cone 254 will result in a linear flow response from very low critical flow rates to the maximum critical flow rate when throat 128 is essentially fully open.

Many other types of fluid flow meters such as turbine meters, rotary meters or diaphragm meters often exhibit a non-linear characteristic at low flow conditions. For some low flow conditions, a change in the discharge coefficient may occur. For these applications, the exterior configuration of nose cone 256 may be modified to compensate for any changes in the discharge coefficient at extremely low critical flow rates. Thus, critical flow venturi 220 and centerbody 250 provide a linear change in flow rate throughout a relatively wide range of critical flow rates.

Figure 6:
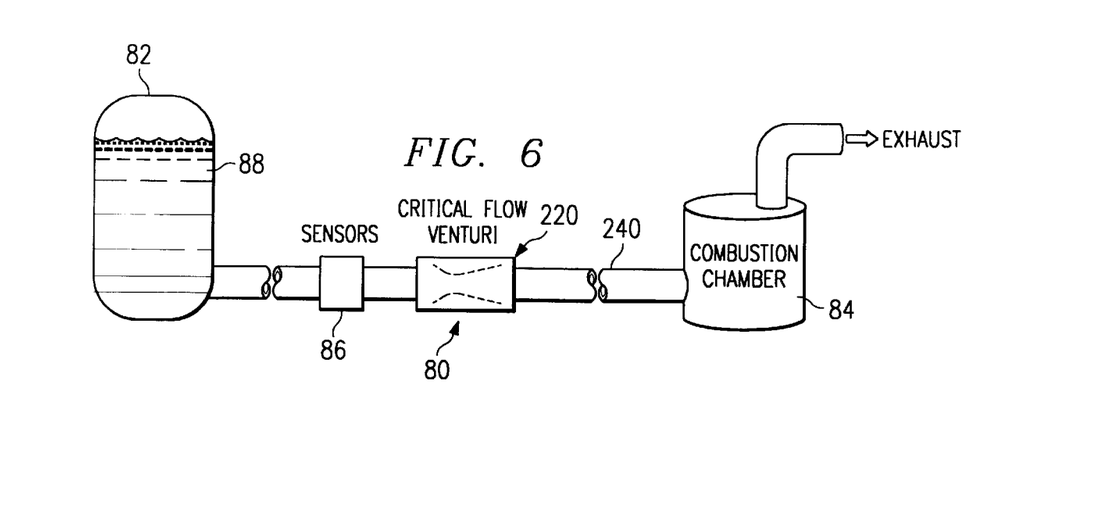
FIG. 6 is a schematic drawing in elevation and partially in section with portions broken away showing a system for controlling and/or measuring the fluid flow into a combustion or mixing chamber.

System 80 for controlling fluid flow from container 82 to combustion chamber 84 is shown in FIG. 6. For some applications, system 80 may include critical flow venturi 220 with centerbody 250 installed therein. Fluid flow conduit 240 is preferably used to connect container 82 with combustion chamber 84. A plurality of sensors 86 such as pressure, temperature and composition are preferably installed within fluid flow conduit 240 between container 82 and critical flow venturi 220.

By measuring temperature, pressure and composition of fluid contained within conduit 240, the position of centerbody 250 may be adjusted relative to throat 128 to provide a constant fluid flow rate, or any other desired flow characteristics, into combustion chamber 84. This feature may be particularly beneficial in aerospace propulsion systems when fuel or oxidizer is dispensed from container 82 over long periods of time. System 80, including container 82 and combustion chamber 84, may form a portion of a rocket motor or a jet engine. Also, combustion chamber 84 may represent a natural gas furnace associated with a steam boiler used to produce electricity. Fluid 88 contained within container 82 may be a liquid, gas or a mixture of liquid and gas depending upon combustion chamber 84 and the specific application for using combustion chamber 84.

When the exterior surface of centerbody 250 is to be contoured to provide a linear response, the fluid flow rate through critical flow venturi 220 is a function of the position of nose cone 254 relative to throat 128. The accumulated mass of fluid passing through critical flow venturi 220 may be determined by integrating the instantaneous position of nose cone 254 over the time during which fluid flows through critical flow venturi 220. In addition to controlling fluid flow into combustion chamber 84, system 80 may also be used to account for the total amount of fuel or oxidizer used by a space craft.

Critical flow venturi 220 and centerbody 250 may be satisfactorily used as part of a system for dispensing compressed natural gas into automobile engines. In addition to accounting for the total amount of compressed natural gas placed in an automobile's storage tank, critical flow venturi 220 and centerbody 250 may be used to minimize fill time or maximize the total amount of natural gas placed in the tank, depending upon the configuration of centerbody 250, and the control algorithm used to position of nose cone 254.

Figure 7:
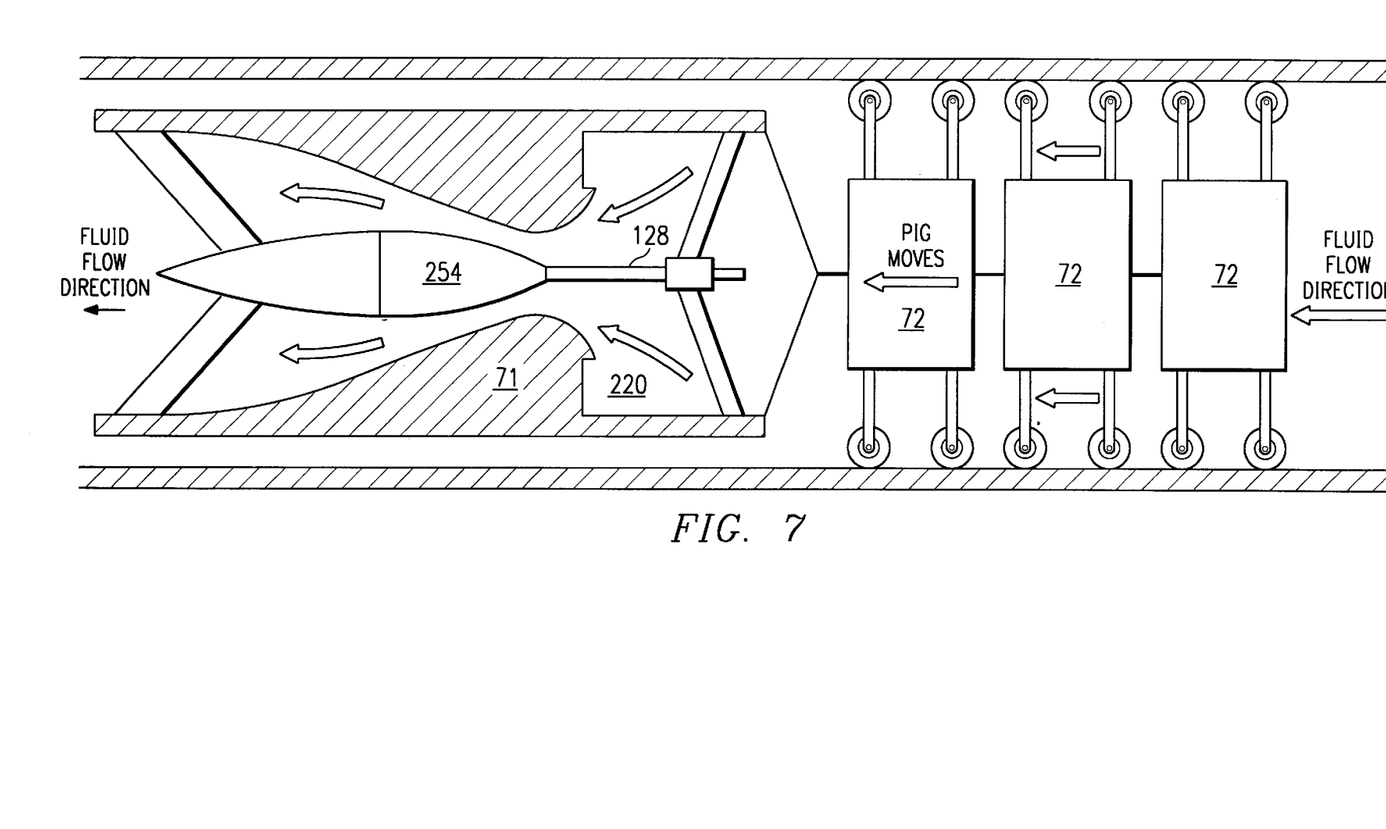
FIG. 7 is a longitudinal cross section of a pipeline in which a venturi in accordance with the invention is being used to control the speed of a "pig."

As illustrated in FIG. 7, critical flow venturi 220 and centerbody 250 may be used as part of a pipeline "pig" 72 (a device which is carried along inside a pipeline, with the fluid flow, to perform inspection or maintenance activities) to control the speed of the pig 72 within the pipeline. In such an application, critical flow venturi 220 and centerbody 250 may be used to control the amount of flowing pipeline fluid that is bypassed around the pig 72 to control the speed of the pig 72 relative to the pipe. The fluid bypass flow amount would be varied by actuating the centerbody nose cone 254 longitudinally relative to the throat 128, to vary the critical flow area of the venturi 220.

Venturi 220 is in a housing 71, which has a circumference slightly less than that of the inner diameter of the pipeline, such that a sliding seal is maintained between the inner wall of the pipeline and the venturi housing 71. The venturi 220 is attached in series with the pig 72 and leads the pig 72 with respect to the flow's (and pig's) direction of motion. In other embodiments, such as with a pig having a single section, venturi 220 could follow the pig.

Critical flow venturi 220 and centerbody 250 may be used with a wide variety of fluid systems. For example, critical flow venturi 220 and centerbody 250 can be used to control the mixing of several different fluids. Critical flow venturi 220 and centerbody 250 can be used to calibrate multiple air flow sensors at different flow rates. Critical flow venturi 220 and centerbody 250 could also be used to measure exhaust gas flow rate and total exhaust gas emission from a manufacturing or refining facility.

Although the present invention and its advantages have been described in detail, it should be understood that various changes, substitutions and alterations can be made herein without departing from the spirit and scope of the invention as defined by the following claims.

What is claimed is:

1. A venturi comprising:

an inlet cone and an outlet cone with a throat disposed therebetween;

the outlet cone and the inlet cone generally aligned concentric with each other to allow a fluid flow through the throat;

the throat forming the narrowest restriction for fluid flow through the venturi;

a centerbody disposed adjacent to the throat and generally axisymmetric with respect to the fluid flow, said centerbody having a fixed portion and a movable portion whereby the movable portion of the centerbody may be moved longitudinally into the throat to reduce the fluid flow area therethrough.

2. The venturi of claim 1 wherein the centerbody further comprises an actuator to move the movable portion of the centerbody relative to the fixed portion of the centerbody to vary the fluid flow area through the throat of the venturi.

3. The venturi of claim 1 further comprising a contoured surface formed on the exterior of the movable portion of the centerbody to provide a linear change in the flow rate through the throat with longitudinal movement of the movable portion of the centerbody relative to the throat of the venturi.

4. The venturi of claim 1 further comprising:

a plurality of sensors disposed upstream from the inlet cone to measure temperature, pressure and composition of fluid entering the inlet cone; and an actuator disposed within the centerbody to vary the position of the movable portion of the centerbody relative to the throat to provide a continuous range of flow rates through the throat for a given set of upstream conditions.

5. The venturi of claim 1 wherein the fixed portion of the centerbody further comprises a contoured exterior surface having a generally conical configuration to minimize pressure loss as fluid exits from the throat of the venturi.

6. The venturi of claim 1 further comprising:

a fluid flow conduit attached to the inlet cone and the outlet cone of the venturi;

a first set of struts disposed within the conduit adjacent to the outlet cone;

the fixed portion of the centerbody attached to the first set of struts;

a second set of struts disposed within the fluid flow conduit adjacent to the inlet cone;

a linear bearing attached to the second set of struts with the linear bearing aligned generally concentric with the inlet cone and the throat; and a guide rod extending from the movable portion of the centerbody through the linear bearing whereby the linear bearing and guide rod cooperate with each other to maintain a generally concentric alignment between the movable portion of the centerbody and the throat.

7. The venturi of claim 1 further comprising a sleeve secured to the movable portion of the centerbody adjacent to the fixed portion of the centerbody whereby the sleeve provides a generally smooth continuous surface on the exterior of the centerbody when the position of the movable portion is varied relative to the fixed portion.

8. A venturi comprising:

an inlet cone and an outlet cone with a throat disposed therebetween;

the outlet cone and the inlet cone generally aligned concentric with each other to allow fluid to flow through the throat;

the throat forming the narrowest restriction for fluid flow through the venturi;

a centerbody disposed adjacent to and longitudinally movable relative to the throat to reduce the fluid flow area therethrough;

the centerbody having a nose cone and a tail cone with a middle portion disposed between the nose cone and the tail cone;

the exterior surface of the nose cone, middle portion and tail portion contoured to minimize fluid pressure losses within the venturi; and the nose cone extending towards the throat and the tail cone extending away from the throat.

9. A system for proving the performance of a fluid flow meter comprising:

a venturi having an inlet cone and an outlet cone with a throat disposed therebetween;

the inlet cone exposed to atmospheric pressure;

the outlet cone attached to a fluid flow conduit;

a blower attached to the fluid flow conduit spaced longitudinally from the venturi;

the fluid flow meter connected to the fluid flow conduit between the flow venturi and the blower whereby all fluid flow through the venturi will flow through the fluid flow meter as the blower draws air through the fluid flow conduit; and a centerbody disposed adjacent to the throat of the venturi to reduce the flow rate therethrough.

10. The system of claim 9 wherein the centerbody comprises:

a fixed portion and a movable portion; and means for moving the movable portion of the centerbody longitudinally into the throat to reduce the flow rate therethrough.

11. The system of claim 9 further comprising:

the centerbody attached to a supporting structure mounted adjacent to and spaced longitudinally from the inlet cone of the venturi;

a portion of the centerbody disposed within the throat of the venturi; and the portion of the centerbody disposed within the throat having a generally cylindrical configuration.

12. The system of claim 11 further comprising the centerbody releasably secured to the supporting structure.

13. The system of claim 11 further comprising:

a plurality of centerbodies which may be releasably secured to the supporting structure to extend into the throat of the venturi; and the portion of each centerbody having a different outside diameter to provide multiple discrete flow rates through the venturi for a given set of upstream fluid conditions.

14. The system of claim 9 wherein the centerbody further comprises:

a middle portion having a generally cylindrical configuration;

a tail cone attached to and extending from the generally cylindrical portion of the centerbody;

the middle portion of the centerbody extending through the throat to position the tail cone within the outlet cone of the venturi; and the tail cone having an exterior surface contoured to minimize pressure losses as fluid exits from the throat.

15. The system of claim 14 wherein the centerbody further comprises:

the cylindrical portion of the centerbody having a first outside diameter;

the tail cone having a base with a second outside diameter; and the first outside diameter of the middle portion larger than the second outside diameter of the base to form a notch on the exterior of the centerbody disposed within the outlet cone.

16. The system of claim 9 wherein the centerbody comprises:

a base having a generally cylindrical configuration;

a middle portion having a generally elongated, cylindrical configuration with one end attached to and extending from the base; and a tail cone formed on the other end of the middle portion opposite from the base.

17. A method for providing the performance of a fluid flow meter using a critical flow venturi having an inlet and an outlet with a throat disposed therebetween, the throat having a fluid flow area which defines comprising the steps of:

connecting the fluid flow meter with the outlet of the critical flow venturi;

connecting the fluid flow meter with a blower to draw air through the critical flow venturi and the flow meter;

drawing air through the critical flow venturi at the first critical flow rate using the blower;

comparing a flow measurement of the meter with the first critical flow rate through the venturi;

inserting a centerbody into the venturi to reduce the fluid flow area within the throat;

drawing air through the critical flow venturi with the blower at a second critical flow rate corresponding with the reduced fluid flow area of the throat; and comparing a flow measurement of the meter with the second critical flow rate.

18. A system for controlling fluid flow from a container to a combustion chamber comprising:

a fluid flow conduit connecting the container with the combustion chamber;

a critical flow venturi disposed within the fluid flow conduit between the container and the combustion chamber;

the critical flow venturi having an inlet cone and an outlet cone with a throat disposed therebetween;

the throat having a cross sectional area that defines in part a critical flow rate;

a plurality of sensors disposed between the fluid container and the critical flow venturi to measure temperature, pressure and composition of the fluid flowing through the fluid flow conduit prior to entering the critical flow venturi;

a centerbody disposed outside one end of the throat and generally axisymmetric with respect to the fluid flow; and at least one portion of the centerbody longitudinally movable relative to the throat of the venturi, whereby movement of the one portion of the centerbody into the throat will reduce the critical flow rate therethrough.

19. A system for controlling fluid flow from a first container to a second container, comprising:

a fluid flow conduit connecting the first container with the second container;

a critical flow venturi disposed within the fluid flow conduit between the first container and the second container;

the critical flow venturi having an inlet cone and an outlet cone with a throat disposed therebetween;

the throat having a cross sectional area that defines in part a critical flow rate;

a plurality of sensors disposed between the fluid container and the critical flow venturi to measure temperature, pressure and composition of the fluid flowing through the fluid flow conduit prior to entering the critical flow venturi;

a centerbody disposed outside one end of the throat and generally axisymmnetric with respect to the fluid flow; and at least one portion of the centerbody longitudinally movable relative to the throat of the venturi, whereby movement of the one portion of the centerbody into the throat will reduce the critical flow rate therethrough.

20. The system of claim 19 wherein the centerbody further comprises a contoured exterior surface to allow longitudinal movement of the one portion of the centerbody relative to the throat to provide a linear change in the critical flow rate through the venturi.

21. A critical flow venturi comprising:

an inlet cone and an outlet cone with a throat disposed therebetween;

the outlet cone and the inlet cone generally aligned concentric with each other to allow a fluid flow through the throat;

the throat forming the narrowest restriction for fluid flow through the venturi;

the throat having a cross sectional area that defines in part a critical flow rate through the venturi;

a centerbody disposed adjacent to the throat and generally axisymmetric with respect to the fluid flow, said centerbody extending longitudinally through said throat and having a reduced cross sectional area in said inlet cone operable to locate a shock wave transition.

22. A method of providing venturi measurements, comprising the steps of:

obtaining a fluid flow through an inlet cone and an outlet cone with a throat disposed therebetween, wherein the outlet cone and the inlet cone generally aligned concentric with each other to allow a fluid flow through the throat and wherein the throat forms the narrowest restriction for fluid flow through the venturi and the throat having a cross sectional area that defines in part a critical flow rate through the venturi;

moving a centerbody, said centerbody disposed adjacent to the throat and generally axisymmetric with respect to the fluid flow, longitudinally toward said throat to a position that provides a desired flow rate through said venturi.

23. The method of claim 22, wherein said venturi is a critical flow venturi and wherein said desired flow rate is a critical flow rate.

24. The method of claim 1, wherein said venturi is a critical flow venturi and wherein said fluid flow through the throat is a critical fluid flow.

* * * * *